United States Patent
Demere

(10) Patent No.: US 7,163,146 B2
(45) Date of Patent: *Jan. 16, 2007

(54) METHODS AND SYSTEMS FOR RETAIL CLUB MEMBERSHIP AUTHORIZATION

(76) Inventor: Raymond S. Demere, 3343 Southview Ave., Montgomery, AL (US) 36111

( * ) Notice: Subject to any disclaimer, the term of this patent is extended or adjusted under 35 U.S.C. 154(b) by 0 days.

This patent is subject to a terminal disclaimer.

(21) Appl. No.: 10/763,036

(22) Filed: Jan. 22, 2004

(65) Prior Publication Data

US 2004/0200897 A1   Oct. 14, 2004

Related U.S. Application Data

(63) Continuation-in-part of application No. 10/347,731, filed on Jan. 21, 2003, now Pat. No. 6,991,160.

(51) Int. Cl.
*G06F 7/08* (2006.01)
(52) U.S. Cl. ..................... 235/381; 235/384
(58) Field of Classification Search ............. 235/384, 235/379, 381, 380; 705/1, 14, 16, 18
See application file for complete search history.

(56) References Cited

U.S. PATENT DOCUMENTS

| | | | |
|---|---|---|---|
| 3,786,421 A | 1/1974 | Wostl et al. | |
| 4,395,626 A | 7/1983 | Barker et al. | |
| 4,395,627 A | 7/1983 | Barker et al. | |
| 4,458,802 A | 7/1984 | Maciver et al. | |
| 4,727,243 A | 2/1988 | Savar | |
| 5,072,380 A | 12/1991 | Randelman et al. | |
| 5,162,638 A | 11/1992 | Diehl et al. | |
| 5,284,364 A | 2/1994 | Jain | |
| 5,327,066 A | 7/1994 | Smith | |
| 5,359,522 A | 10/1994 | Ryan | |
| 5,420,405 A | 5/1995 | Chasek | |
| 5,722,526 A | 3/1998 | Sharrard | |
| 5,797,470 A | 8/1998 | Bohnert et al. | |
| 5,890,136 A | 3/1999 | Kip | |
| 5,913,180 A | 6/1999 | Ryan | |
| 6,098,879 A | 8/2000 | Terranova | |
| 6,116,505 A | 9/2000 | Withrow | |
| 6,254,005 B1 | 7/2001 | Smith et al. | |
| 6,422,464 B1 | 7/2002 | Terranova | |
| 6,612,488 B1 * | 9/2003 | Suzuki | 235/380 |

OTHER PUBLICATIONS

Store Equipment—To Catch a Thief; http://www.npnweb.com/uploads/featurearticles/2005/StoreEquipment/0505_se3.asp; visited on Jul. 18, 2005.
Driving Down Drive-Offs; http://www.c-storedecisions.com/article/6972; visited on Jul. 18, 2005.
New Program From Quiktrip Targets 'Drive-Offs' at Gas Stations; http://www.bizjournals.com/wichita/stories/2005/03/07/daily16.html; visited on Jul. 18, 2005.

(Continued)

*Primary Examiner*—Karl D. Frech
(74) *Attorney, Agent, or Firm*—Kilpatrick Stockton LLP

(57) ABSTRACT

The present invention provides systems and methods for remote authorization of fuel dispensing and authorization or confirmation of participation in frequent shopper programs, club memberships, and the like. In one embodiment, identification documents may be used as membership cards for a retailer's membership or frequent shopper program. In another embodiment, an identification may be a membership card to gain access to a retailer.

36 Claims, 2 Drawing Sheets

OTHER PUBLICATIONS

Convenience Stores Have New Plan to Battle Gas Theft—Pumpstart Thwarts Gas Thefts, Avoids Prepaying; http://www.dmregister.com/apps/pbcs.dll/article?AID=/20050707/NEWS08/507070359/10, visited Aug. 4, 2005.

\* cited by examiner

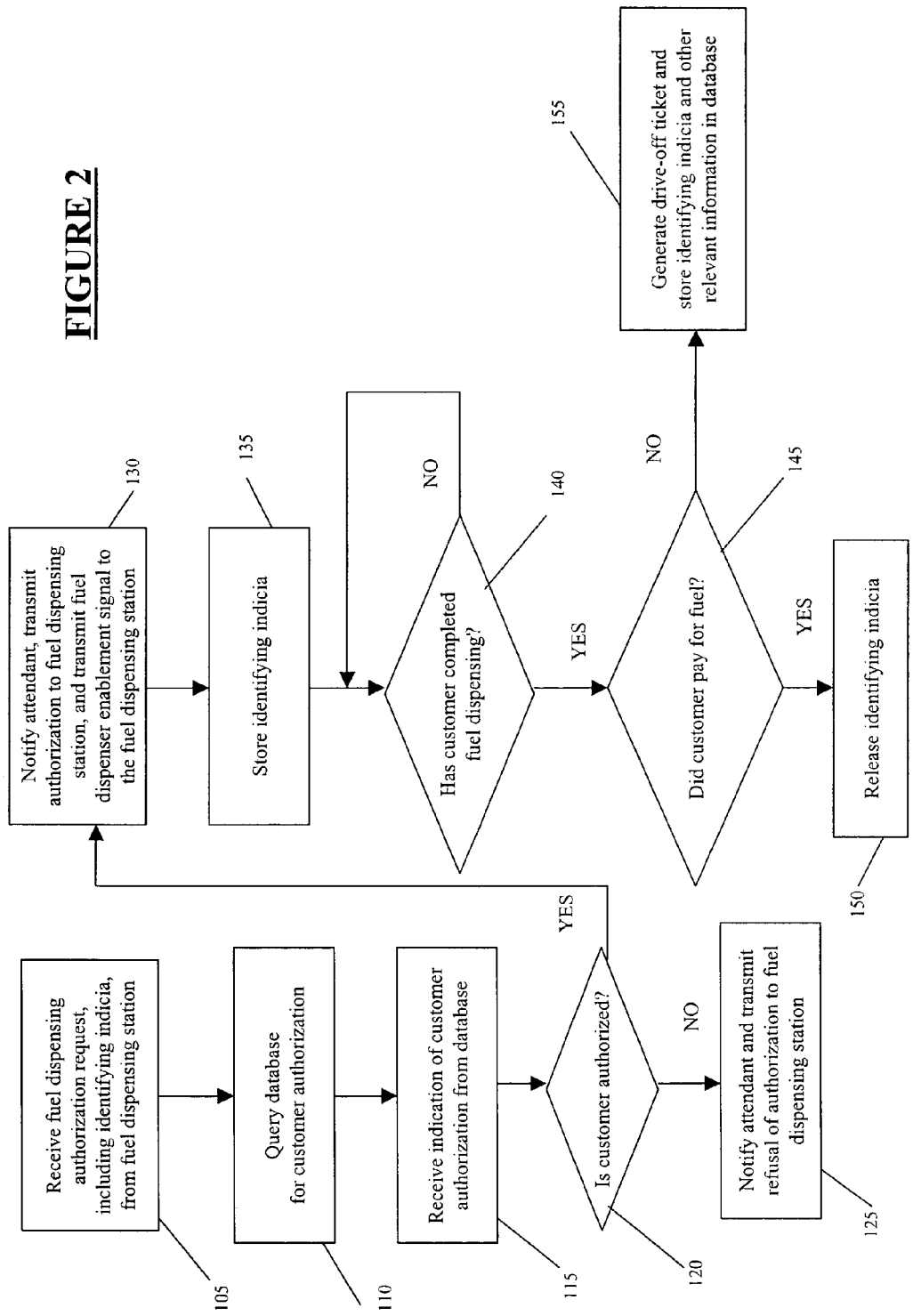

METHODS AND SYSTEMS FOR RETAIL CLUB MEMBERSHIP AUTHORIZATION

This application is a continuation-in-part application of U.S. application Ser. No. 10/347,731, filed Jan. 21, 2003, is now U.S. Pat. No. 6,991,160, the entire contents of which are hereby incorporated by reference.

FIELD OF THE INVENTION

The present invention generally relates to systems and methods for remote authorization of fuel dispensing and authorization or confirmation of participation in frequent shopper programs, club memberships, and the like.

BACKGROUND OF THE INVENTION

Many gasoline retailers are reporting an increase in gasoline theft, or "drive-offs." A drive-off occurs whenever an automobile refueling at a remote, enabled fuel dispenser drives off without its occupants having paid for the gasoline. Drive-offs cost the industry nearly $300 million a year, which is more than $3,000 per store selling gas, and it is no longer just teenagers taking a few dollars for a thrill. It is now grown adults taking a full tank, which costs as much as $50 when the automobile being filled up is a sport utility vehicle. Many service station owners make only pennies a gallon. Thus, to make up for a $10 drive off, they have to sell anywhere from two to three hundred gallons of gas. It is money that retailers cannot recover or that retailers are forced to pass on to law-abiding customers, affecting both gas prices and in-store convenience items such as food and beverages. Additionally, some drive-offs leave the gas station at unsafe speeds to avoid being caught, creating a more dangerous environment.

The problem has become so serious that more than twenty states have recently passed laws in which a judge has the discretion to suspend the driver's license of someone convicted of gas theft. Several states have passed laws that motorists convicted twice for stealing gas automatically lose their licenses for six months, and another state law permits warrantless arrests for drive-offs.

However, despite tougher laws, police still solve very few cases of drive-offs, often because of a lack of information. Some police reports only list the color of the car, no make, model or description. Even with license plate numbers, it is difficult for law enforcement personnel to catch the thieves. Though it is tough to catch violators, service station owners do not take the crimes lightly and have become more aggressive in gathering and sending information to the police, some even installing cameras to photograph license plates and patrons.

One option often suggested by police to curtail drive-offs is to require prepayment, making people use a credit card or cash before they are able to pump a drop of gas. With prepay systems, each pump is not "enabled" (i.e., ready for pumping without attendant intervention) to purchase gasoline until the customer pays either by credit card or cash. Remote, point-of-sale systems allowing for payment using a customer credit or debit card and automatically enabling fuel dispensers directly from a fuel island, such as those disclosed in U.S. Pat. Nos. 4,395,626 and 4,395,627 to Barker et al. which are hereby incorporated by reference in their entireties, are well known to those skilled in the art. Similarly, systems for accepting cash payments at the pump or fuel island, such as the system disclosed in U.S. Pat. No. 5,797,470 to Bohnert et al. which is incorporated herein by reference in its entirety, are also well known to those skilled in the art.

However, remote cash pre-payment systems have not proven as effective as remote credit card pre-payment systems because of numerous issues, including providing cash change back to the customer and collecting the cash from one or multiple fuel islands. Because remote cash pre-payment systems are rare, most customers desiring to prepay for a fuel purchase with cash must still make two trips to the central location for pre-payment and for obtaining any change due and a receipt. Remote credit or debit pre-payment systems also have drawbacks, including that some customers do not wish to use credit and debit cards to pay for gas or other transactions and other customers, such as teenagers, may not even have a credit or debit card they can use at the pump. Now, when for so many years pumps were already enabled when customers arrived at the fuel island and prepayment systems have become widely available, consumers have become accustomed to conducting fuel purchase transactions without the need to walk to the central location for both pre-payment and post-pumping wrap-up.

Though some retailers have gone completely to a prepay-only system, the vast majority of service station owners have not because they want to provide their customers with options. As service station owners know, customers want convenience, and if one service station does not offer it, people will go elsewhere. It is clear that neither leaving the pumps in an enabled state at all times nor requiring prepayment are completely satisfactory to service station owners because neither option provides both protection against drive-offs and the flexibility consumers desire. Accordingly, there is a need for systems and methods for remote authorization of fuel dispensing that reduce drive-offs but do not require prepayment by cash, credit cards, or the like.

SUMMARY OF THE INVENTION

The present invention provides systems and methods for remote authorization of fuel dispensing using identifying indicia associated with a customer. An exemplary system according to the present invention includes a fuel dispensing station interfaced with a central terminal that is interfaced with an off-site terminal for transmission and receipt of identifying indicia, customer authorization, and related information. The fuel dispensing station includes a processor that may be configured to interface with several peripheral devices, including an identification document reader, a receipt printer, an audio transducer, a keypad, and a display.

In an exemplary embodiment, an identification document reader enables a customer to use an identification document to obtain authorization prior to fuel dispensing. The identification document reader may read an identification document by a variety of means. Identifying indicia may be inscribed on an identification document by characters capable of being read and interpreted by an optical reader or may be of a more direct machine readable language such as a bar-stripe code, a magnetic strip, a series of punched-out holes, an electronic "chip," or any other suitable medium for conveying a customer's identifying indicia. Accordingly, the identification document reader may be capable of reading identifying indicia presented in any, some, or all of the manners listed above. Optionally, alternative or additional means for obtaining identifying indicia, such as from biometric data associated with a physical characteristic of the customer, may be used.

A central terminal is interfaced with the fuel dispensing station. A processor at the central terminal may be configured to interface with several peripheral devices which are interconnected by means of a cable or bus, such as an I/O device, a keypad, a display, a printer, a data transmission port, and a database. The data transmission port provides for communication with an off-site terminal.

In an exemplary embodiment, when an identification document is received by the identification document reader of the fuel dispensing station, identifying indicia is extracted therefrom and transmitted to the central terminal. The processor of the central terminal then queries a local database, a database at the off-site terminal, or both regarding whether the fuel dispenser at the fuel dispensing station should be authorized based on the identifying indicia received. The off-site terminal may include a database and a server for storing, accessing, and modifying customer records from which the authorization of customers can be determined. The off-site terminal may be a centralized data bank serving numerous service stations from a remote location, and the database may be maintained in a variety of ways.

The central terminal processes an indication of customer authorization received from the database(s) queried that indicates whether the customer is authorized to dispense fuel. The central terminal then transmits the indication to the fuel dispensing station. If the customer has been authorized, a fuel dispenser enablement signal is sent to the fuel dispensing station by the central terminal to enable the pump, and the customer may dispense fuel. In an exemplary embodiment, the customer's identifying indicia may be temporarily stored by the central terminal while the customer dispenses fuel. Once the customer has completed dispensing and paid for the fuel, the identifying indicia is released. If the customer does not pay for the dispensed fuel, the identifying indicia may be stored locally at the central terminal and/or forwarded to the off-site terminal for storage in its database. Additionally, the central terminal may generate a drive-off ticket that includes the customer's identifying indicia, the date, the dollar amount of gas not paid for, and other information. The drive-off ticket may be forwarded to law enforcement or the central terminal may electronically notify law enforcement of the drive-off.

If the customer is refused authorization, the customer may be notified of the refusal by the attendant or by an audio or video message at the fuel dispensing station. Optionally, the customer may be provided with a printed receipt for gas not paid for in any previous drive-off and given an opportunity to pay the unpaid bill plus a collection fee. Also optionally, the customer may be notified of the reason for refusal and presented with a warrant and/or collection notice based on the previous drive-off, and law enforcement may be notified electronically of the customer's whereabouts.

Additional embodiments of systems and methods according to the present invention involve using identification documents for participation in frequent shopper programs, club memberships, and the like. In one embodiment, identification documents may be used as membership cards for a retailer's membership or frequent shopper program. For example, to obtain certain rewards at a grocery store, a user may swipe his identification document upon checkout at an identification document reader. The identification document reader may any of the types previously described herein (depending on the type of identifying indicia the retailer chooses to use). The identification document reader reads identifying indicia from the identification document to record information about the user's purchase in accordance with the frequent shopper program. For example, if the rewards program provides the user $2 cash back for every $100 spent at the store, then the point of sale terminal at checkout obtains the identifying indicia from the identification document and the amount of purchase and transmits that information to an off-site terminal for processing and storage in accordance with the retailer's rewards program.

In another embodiment, an identification may be a membership card to gain access to a retailer. For example, a retailer may require its customers to pay annual dues and carry membership cards to gain entry to the retailer's locations. Rather than using membership cards, the retailer may use identification documents that its customers already have as the preferred method of identification to gain access to the retailer's locations. This eliminates the cost of making separate membership cards for each customer, which may be substantial. Upon joining as a member, the retailer can read identifying indicia from a new customer's identification document and store that information in a central database. The retailer can generate dues invoices, special promotion advertisements, and the like using the information obtained at sign-up. At each of its locations, the retailer may post an identification document reader of any type described herein (depending on the type of identifying indicia the retailer chooses to use) to read identification documents of persons as they enter the store. Once the identification document reader reads the identifying indicia from the identification document, it is compared to the stored information and the customer is verified as one who may enter. If the comparison reveals no matching stored information, then the customer is denied entry to the retailer's location.

BRIEF DESCRIPTION OF THE DRAWINGS

FIG. 2 is a flow diagram of an exemplary embodiment of a method according to the present invention.

DETAILED DESCRIPTION OF THE INVENTION

Figure 1:
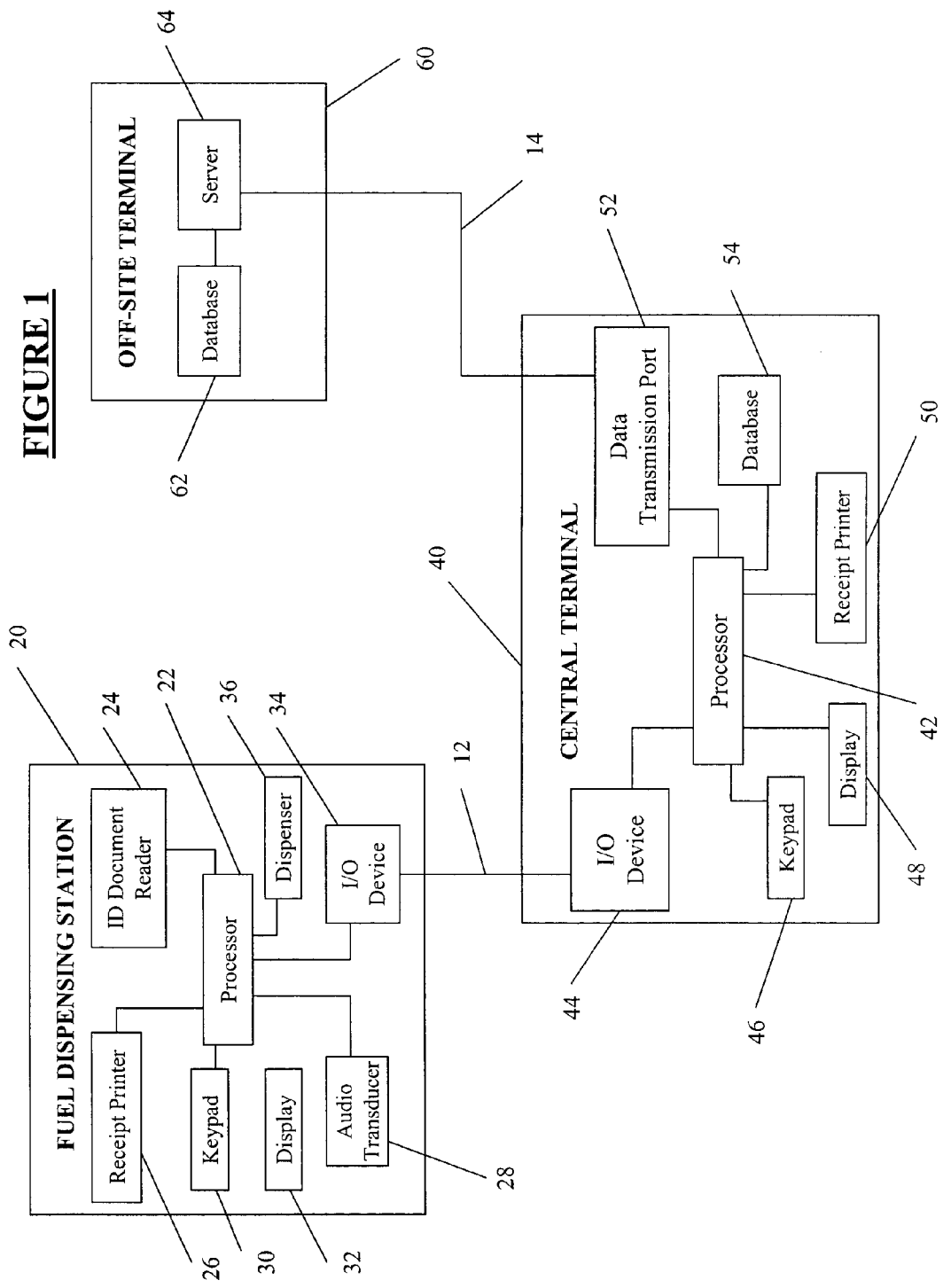
FIG. 1 is a block diagram of an exemplary embodiment of a system of the present invention.

The present invention provides systems and methods for remote authorization of fuel dispensing using identifying indicia associated with a customer. An exemplary system according to the present invention includes a fuel dispensing station interfaced with a central terminal that is interfaced with an off-site terminal. In this application, identification document includes drivers' licenses, passports, green cards, state or federal issue identification cards, and the like. Fuel includes leaded, unleaded, and diesel gasoline, oil, petroleum, propane, electricity, and any other consumable energy source or other commodity.

FIG. 1 shows a block diagram of an exemplary embodiment of a system of the present invention. A serial cable 12 connects a fuel dispensing station 20 to a central terminal 40. Fuel dispensing station 20 is typically located at a service station island and includes a fuel dispenser 36, such as a pump. It should be understood that a fuel dispenser, such as fuel dispenser 36, of a fuel dispensing station, such as fuel dispensing station 20, may be connected to a central terminal, such as central terminal 40, by the same or a separate underground or serial cable from that used to connect the remainder of the fuel dispensing station to the central terminal. Central terminal 40 is typically located in the store or cashier's area of a service station. A transmission cable 14 connects central terminal 40 to an off-site terminal 60 for transmission and receipt of customer-related and other information. A network modem (not shown) is connected to central terminal 40 for interfacing central terminal 40 with off-site terminal 60. Other means of interconnecting fuel dispensing station 20 and central terminal 40 and off-site terminal 60 may be used.

For simplicity, only one fuel dispensing station is shown in FIG. 1. However, it should be understood that more than one fuel dispensing station may be connected to central terminal 40, and most service stations typically have a plurality of fuel dispensing stations connected to a central terminal. In such instances where more than one fuel dispensing station is present, a junction box (not shown) may be provided for splitting the transmission line out from central terminal 40. A pair of conventional opto isolators, which are well known to those skilled in the art, may be employed to isolate multiple fuel dispensing stations and to minimize the induced noise on the communications lines. It will be appreciated that alternative isolation circuits may be employed, such as transformers or the like. Junction boxes suitable for use with certain exemplary embodiments of this invention are available from Tokheim Corporation, Fort Wayne, Ind., and are well known to those skilled in the art.

Central terminal 40 acts as a master control console and may perform several functions. Central terminal 40 typically performs the cash register functions associated with the sale of fuel and other merchandise, including accepting cash, debit, and credit payments and the like, using a built-in keypad, alphanumeric display, and associated logic. Central terminal 40 also provides for remote enabling of the fuel dispensers for dispensing fuel upon attendant request. Other items, such as pin pads and journal printers, which are well known to those skilled in the art, may be connected to central terminal 40.

Fuel dispensing station 20 is preferably implemented with a conventional processor 22. An exemplary processor is an 8-bit parallel bus Z80 Microprocessor, which is well known by those skilled in the art, having an arithmetic and logic unit (ALU), a plurality of registers, including an instruction register, memory, and a central processing unit (CPU) for interpretation and execution of micro-level assembly instructions.

Processor 22 is configured to interface with several peripheral devices which are interconnected by means of a cable or bus. The peripheral devices include an identification document reader 24, a receipt printer 26, an audio transducer 28, a keypad 30, and a display 32. Receipt printer 26 is configured to input paper status signals to processor 22, and processor 22 sends print messages to receipt printer 26. To aid the operation of fuel dispensing station 20, audio transducer 28 may be present to provide auditory feedback to a customer during use. Other audio and/or video electronics (not shown) may be adapted to interface with fuel dispensing station 20 and/or an auxiliary audio/video source to provide advertising, merchandising, and multimedia presentations to a customer in addition to basic authorization functions. Fuel dispensing station 20 may provide a graphical user interface (GUI) with keypad 30 and display 32.

In an exemplary embodiment, identification document reader 24 enables a customer to use an identification document to obtain authorization prior to fuel dispensing. Identification document reader 24 is configured as an input device to processor 22. Identification document reader 24 may include an insertion slot where a customer inserts the identification document bearing the customer's identifying indicia. Examples of identifying indicia include, but are not limited to, identification document number (e.g., driver's license number, passport number, etc.), height, weight, eye color, birth date, and the like, which may typically be found on an identification document, or a combination of any or all of the above. Identifying indicia may also include biometric data provided by a customer that relates to a physical characteristic of the customer, as further described below.

Identification document reader 24 may read an identification document by a variety of means. Identifying indicia may be inscribed on an identification document by characters capable of being read and interpreted by an optical reader or may be of a more direct machine readable language such as a bar-stripe code, a magnetic strip, a series of punched-out holes, an electronic "chip," or any other suitable medium for conveying a customer's identifying indicia. Accordingly, identification document reader 24 may be capable of reading identifying indicia presented in any, some, or all of the manners discussed above. The various technologies that may be used to read an identification document are well understood by those skilled in the art, and several examples of such technologies are briefly described in the paragraphs below for the reader's reference.

As one example, a magnetic strip may be deposited on the surface of an identification document and recorded electronically with identifying indicia of a customer using methods and apparatus similar in principle to those used for recording data on computer disks and credit cards, which are well known to those skilled in the art. Magnetically encoded documents are difficult to tamper with and may be well suited for use as identification documents.

As another example, identification document reader 24 may have the ability to read electronic chips that contain a customer's identifying indicia. Such chips are commonly used in so-called "smart cards" and are well known to those skilled in the art. These are particularly useful in unattended remote authorizations used in which no human attendant is present to monitor, assist, or otherwise supervise operation of the identification document reader or the associated fuel dispensing station. An electronic chip on the identification document stores identifying indicia about the customer. The chip includes memory registers, and may also include a microprocessor. In an authorization based on an identification document with a chip, a customer inserts the identification document into identification document reader 24. Identification document reader 24 reads the identifying indicia from the identification document and transmits the identifying indicia to central terminal 40 for authorization.

Conceivably, the identifying indicia provided by the customer at fuel dispensing station could also be biometric data relating to a physical characteristic of the customer, such as a retina scan or fingerprint. Accordingly, in certain exemplary embodiments of this invention, fuel dispensing station 20 may include, in addition to or instead of identification document reader 24, other means (not shown) for receiving or extracting identifying indicia, such as a fingerprint scanner, a retina scanner, a voice identification unit, and the like, or a combination of any of these means.

Once identifying indicia is received by fuel dispensing station 20, processor 22 enters into a control sequence for the execution of a fuel dispensing authorization request to send to central terminal 40. During execution of the control sequence and thereafter, processor 22 may provide pertinent information on display 32 to assist the customer in completing the authorization and/or fuel purchase transaction.

Fuel dispenser 36 is connected to processor 22, and an input/output (I/O) device 34 is connected to processor 22 for executing the fuel dispensing authorization request control sequence with central terminal 40. I/O device 34 allows the parallel bus structure of processor 22 to interface with a serial communications data port. I/O device 34 may be implemented to provide direct serial communications with central terminal 40 or, alternatively, establish a communications link through a junction box when more than one fuel dispensing station is present.

A processor 42 of central terminal 40 receives a fuel dispensing authorization request from fuel dispensing station 20. Processor 42 may be implemented with a conventional microprocessor, such as an Intel 80386 Microprocessor supported by random access memory (RAM) and a programmable read-only memory, which is well known to those skilled in the art. A serial data communication link is established between fuel dispensing station 20 and central terminal 40 via I/O devices 34 and 44. Typically, I/O devices 34 and 44 may each be a universal synchronous and asynchronous receiver and transmitter (USART) operating in conjunction with one or more line drivers and receivers (not shown), which is well understood by those skilled in the art. I/O devices 34 and 44, may perform data packaging in either a synchronous or asynchronous format, both of which are well known to those skilled in the art.

Processor 42 is the primary control hub of central terminal 40. Processor 42 is configured to interface with several peripheral devices which are interconnected by means of a cable or bus. In the embodiment shown in FIG. 1, the peripheral devices include I/O device 44, a keypad 46, a display 48, a printer 50, a data transmission port 52, and a database 54. Keypad 46 and display 48 allow the attendant to perform the transaction functions associated with the sale of fuel and merchandise, including accepting cash, debit cards, credit cards and the like, at central terminal 40. In addition, processor 42 provides automated management of the transactions enabled at fuel dispensing station 20 received via I/O device 34. Suitable consoles for use with exemplary embodiments of the present invention are well known to those skilled in the art. Data transmission port 52 provides for communication with off-site terminal 60 for customer authorization.

Typically, when an identification document is received by identification document reader 24 of fuel dispensing station 20, identifying indicia is extracted therefrom and transmitted to central terminal 40 via processor 22 and I/O device 34, as indicated above. The identifying indicia is coupled to processor 42 which may generate a message for display at fuel dispensing station 20. Processor 42 then queries database 54 and/or enters a subroutine for querying off-site terminal 60 via transmission cable 14 regarding whether fuel dispensing should be authorized based on the identifying indicia received. Subroutines similar to those for transmitting credit and debit card account information, which are well known to those skilled in the art, may be used. After submitting its query, processor 42 enters into a wait mode for an indication of customer authorization from database 54 and/or off-site terminal 60.

Off-site terminal 60 includes a database 62 and a server 64 for storing, accessing, and modifying customer records from which the authorization of customers can be determined. Off-site terminal 60 may be a centralized data bank serving numerous service stations from a remote location. For example, off-site terminal 60 may serve all service stations in a greater metropolitan area, all service stations owned by a particular service station operator, or all service stations providing a particular brand-name of fuel (e.g., Shell or Texaco).

It should be understood that certain embodiments according to this invention may include a database local to the central terminal (such as database 54), a remote database (such as database 62), or both. There are numerous examples of ways in which a database may be maintained at central terminal 40 or off-site terminal 60. It should be understood that the examples provided herein are not intended to be limiting, but rather are presented as illustrative of certain exemplary embodiments of the present invention. Additionally, it should be understood that off-site terminal 60 is not required to be off site. In several preferred embodiments of the present invention, off-site terminal 60 serves multiple service stations and is typically not located on the site of any single service station. However, in other embodiments, off-site terminal 60 may be located on the site of one of the plurality of service stations that off-site terminal 60 serves. Additionally, off-site terminal 60 may serve a single service station and in this case may typically be located on the site of the service station it serves and may further be part of central terminal 40 in such an instance.

In an exemplary embodiment, database 54 may store a record for each customer who has a previously recorded drive-off (i.e., did not pay for dispensed fuel). The drive-off records may be based only on information gathered from a plurality of service stations served by off-site terminal 60, or the records may be based on additional sources of information, such as publicly available criminal or civil records, a sharing agreement with other fuel providers or service stations, and the like. The records stored at database 54 may be downloaded from off-site terminal 60 or other external sites and updates may be downloaded, either arbitrarily or periodically (e.g., once a day, once every two days, etc.). In an embodiment where the fuel authorization system only includes one service station, all of the necessary customer records may be maintained at database 54 and periodic or further downloads from off-site terminal 60 or other external sites are not required.

In this example, processor 42 queries database 54 for an indication of customer authorization indicating whether the customer should be authorized to dispense fuel based on whether database 54 contains a record for that customer. If database 54 includes a record for the customer, then processor 42 receives an indication that is negative or is notified that the customer is to be refused authorization. If database 54 contains no record corresponding to the customer, then processor 42 receives a positive indication or is notified that the customer should be authorized to dispense fuel.

In another example, database 54 may store a record for each customer based on the customer's voluntary membership in a fuel authorization program, either by previously applying for membership or first time use of a service station served. The customer may apply for membership in an authorization program of a particular service station, group of stations, or fuel brand-name provider prior to using a service station for the first time. The customer voluntarily submits identifying indicia that is stored in database 54 for later access. In the first-time use example, the customer record is created the first time the customer uses a particular service station and the customer's identifying indicia is stored in database 54 at that time. When the customer seeks authorization at a participating service station, database 54 includes a customer record and central terminal 40 queries database 54 as to whether the customer is authorized. Non-members are refused authorization under such a system, as are members who have one or more drive-offs recorded under their customer record.

As noted above, database 54 is not required, and instead database 62 may be utilized for the storage of customer records in the same manner described above for database 54. In such an embodiment, central terminal 40 communicates with off-site terminal 60 to determine customer authorization and database 62 is queried. In a system with both database 54 and database 62, a two-tiered approach to customer authorization may be utilized. For example, in a system containing negative files or customer records based on previous drive-offs, central terminal 40 may first query database 54 for customer authorization. If a customer record is not found in database 54, central terminal 40 may communicate with off-site terminal 60 to determine whether a customer record is present in database 62. If not, then the customer is authorized. If a record is present in database 62, then the customer is refused authorization.

In another embodiment utilizing database 54 and database 62, database 62 may contain files including customer records gathered from a plurality of service stations. Central terminal 40 may download customer records frequently to update its database to include customer records from other service stations. Additionally, off-site terminal 60 may upload new customer records obtained and stored by central terminal 40 on a periodic or arbitrary basis so that those customer records are available for access or download to the other service stations served by off-site terminal 60.

Where biometric data is used as identifying indicia, as briefly described above, off-site terminal 60 may preferably include a database containing records that include biometric data (this database may also be local to central terminal 40, similar to the above). For example, a database may contain the fingerprints of persons who have been previously charged or convicted of drive-offs, or, alternatively, a database may include fingerprints for customers who voluntarily submit their fingerprints so that they may be a member of a fuel authorization program offered by a service station owner, a group of owners, or the like. In the latter instance, the fingerprints of customers who wish to voluntarily participate are stored in a database, and the database is then checked to see whether the customer is a member, and, if so, the dispensing of fuel is authorized.

Regardless of whether database 54, database 62, or both are queried, processor 42 processes the data received from the queried database(s) to determine whether the customer is refused authorization for any reason. A particular message is generated by processor 42 for display to the attendant at central terminal 40. The same message or a different message may also be displayed at fuel dispensing station 20, depending on the preferences of the authorization system operator. The attendant may have override capabilities allowing for manual authorization of a customer where a refusal of authorization appears to be in error or where otherwise appropriate.

If the customer has been authorized, a fuel dispenser enablement signal may be sent by central terminal 40 to fuel dispensing station 20 and the customer may dispense fuel. In an exemplary embodiment where customer records are maintained based on previous drive-offs to determine customer authorization, the customer's identifying indicia is temporarily stored by central terminal 40 while the customer dispenses fuel. Once the customer has completed dispensing and paid for the fuel, the identifying indicia is released. If the customer does not pay, the identifying indicia may be stored in database 54 and/or forwarded to off-site terminal 60 for creation and storage of a customer record in database 62. Additionally, the service station attendant may select a key on central terminal 40 to print a drive-off ticket or a drive-off ticket may be automatically printed. The drive-off ticket includes the customer's identifying indicia, the date, the amount of gas not paid for, and other information and may be forwarded to law enforcement. Additionally, it may be possible to provide electronic notification of the drive-off to law enforcement using central terminal 40 and a network modem.

If the customer is refused authorization, the customer may be notified of the refusal by the attendant or by a message on display 32 of fuel dispensing station 20. Optionally, the customer may be provided with a printed receipt for gas not paid for in any previous drive-off and given an opportunity to pay the unpaid bill plus a collection fee. Also optionally, the customer may be notified of the reason for refusal and presented with a warrant and/or collection notice based on the previous drive-off, and law enforcement may be notified electronically of the customer's whereabouts.

Referring to FIG. 2, a process flow diagram depicting an exemplary embodiment of the present invention is shown. The process flow is from the perspective of a central terminal, such as central terminal 40 described above, when a customer attempts to obtain authorization for fuel dispensing from a fuel dispensing station, such as fuel dispensing station 20 described above. At block 105, the central terminal receives a fuel dispensing authorization request from a fuel dispensing station. The fuel dispensing authorization request includes identifying indicia that identifies the customer. Typically, the customer has provided this information to an identification document reader or other receiving means at the fuel dispensing station. The identification document reader extracts the identifying indicia from an identification document provided by the customer. At block 10, the central terminal queries a database for authorization of the customer. As noted above, the database queried may be local to the central terminal, remote at an off-site terminal, or both such databases may be queried. In an exemplary embodiment, the database queried includes a database with records of customers who have previously driven-off (i.e., dispensed fuel and then failed to pay for it). If a record matching the identifying indicia provided by the customer is found in the database, then the central terminal receives a negative indication of customer authorization. Otherwise, a positive indication of customer authorization is received by the central terminal.

At block 115, the central terminal receives the indication, positive or negative, of customer authorization from the database queried. If the customer is not authorized, block 120, the central terminal notifies the service station attendant of the refusal of authorization and transmits notice of the same to the fuel dispensing station, block 125. Other actions may be taken in conjunction with notifying the customer of the refusal of authorization, including contact by the attendant or display or printing of a message at the fuel dispensing station to explain the reason for refusal and provide the customer an opportunity to pay past due amounts, or notification of law enforcement of the whereabouts of the customer. If the customer is authorized, block 120, the central terminal notifies the attendant of the authorization, transmits notice of the same to the fuel dispensing station, and transmits a fuel dispenser enablement signal to the fuel dispensing station, block 130.

At block 135, the central terminal stores the identifying indicia while the customer dispenses fuel. If the customer has completed dispensing fuel, block 140, the central terminal awaits an indication of whether the customer has paid for the fuel, block 145. Checking for completion of fuel dispensing by the customer in block 140 may be accomplished in a number of ways, including manual entry by a service station attendant, periodic automatic checking by communication of the central terminal with the fuel dispensing station, recognition by the central terminal of when the fuel dispenser at the fuel dispensing station has been returned to a "rest" state, and other similar manners. Similarly, waiting for an indication that the customer has paid for the dispensed fuel may be carried out in a variety of ways, including manual entry by the attendant, receipt of information from the fuel dispensing station that the customer is paying with cash, credit, or debit card at the fuel dispensing station, receipt of another fuel dispensing authorization request from the same fuel dispensing station when no indication of payment has been received, and other similar manners.

If the customer has paid for the fuel, block 145, the central terminal releases the identifying indicia, block 150. If the customer has not paid for the fuel, block 145, the central terminal generates a drive-off ticket and stores the identifying indicia of the customer and other relevant information about the drive-off, block 155. The drive-off ticket includes the customer's identifying indicia, the date, the amount of gas not paid for, and other information, and the drive-off ticket may be forwarded electronically or otherwise to law enforcement. Printing of a generated drive-off ticket may be initiated by the central terminal itself or may require the attendant to manually indicate that a drive-off ticket should be printed. The identifying indicia may be stored in a database local to the central terminal, a remote database at an off-site terminal, or both. The identifying indicia, along with the date, the amount of gas not paid for, the fuel dispenser number, and other information, may be stored as a customer record, so that if the same customer attempts to obtain authorization for fuel dispensing at the same or another service station served by the off-site terminal (where a database serving multiple service stations is present), the customer is refused authorization because the database contains a record of the customer's drive-off.

Additional embodiments of systems and methods according to the present invention involve using identification documents for participation in frequent shopper programs, club memberships, and the like. In one embodiment, identification documents may be used as membership cards for a retailer's membership or frequent shopper program. For example, to obtain certain rewards at a grocery store, a user may swipe his identification document upon checkout at an identification document reader. The identification document reader may any of the types previously described herein (depending on the type of identifying indicia the retailer chooses to use). The identification document reader reads identifying indicia from the identification document to record information about the user's purchase in accordance with the frequent shopper program. For example, if the rewards program provides the user $2 cash back for every $100 spent at the store, then the point of sale terminal at checkout obtains the identifying indicia from the identification document and the amount of purchase and transmits that information to an off-site terminal for processing and storage in accordance with the retailer's rewards program.

In another embodiment, an identification may be a membership card to gain access to a retailer. For example, a retailer may require its customers to pay annual dues and carry membership cards to gain entry to the retailer's locations. Rather than using membership cards, the retailer may use identification documents that its customers already have as the preferred method of identification to gain access to the retailer's locations. This eliminates the cost of making separate membership cards for each customer, which may be substantial. Upon joining as a member, the retailer can read identifying indicia from a new customer's identification document and store that information in a central database.

The retailer can generate dues invoices, special promotion advertisements, and the like using the information obtained at sign-up. At each of its locations, the retailer may post an identification document reader of any type described herein (depending on the type of identifying indicia the retailer chooses to use) to read identification documents of persons as they enter the store. Once the identification document reader reads the identifying indicia from the identification document, it is compared to the stored information and the customer is verified as one who may enter. If the comparison reveals no matching stored information, then the customer is denied entry to the retailer's location.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A method of validating a customer in a retail membership club, the method comprising:
   receiving a membership validation request, including identifying indicia, from a remote retail location, the identifying indicia being extracted from an identification document of a user by an identification document reader at the remote retail location;
   querying a remote database for validation of the customer;
   receiving an indication of membership validation from the database; and
   transmitting the indication to the remote retail location wherein the identification document is one or more members selected from the group consisting of a driver's license, a passport, a green card, a state issue identification card, and a federal identification card.

2. The method of claim 1, further comprising:
   if the indication is positive, transmitting information about the customer's purchase for storage in the remote database.

3. The method of claim 1, further comprising:
   if the indication is positive, providing the customer access to the remote retail location.

4. The method of claim 1, wherein the retail location is a fuel dispensing station.

5. A method for obtaining authorization of fuel dispensing comprising:
   extracting identification indicia from an identification document of a customer using an identification document reader at a fuel dispensing station, the identification document being unusable for payment;
   transmitting a fuel dispensing authorization request including the identifying indicia to a central terminal for use in querying a database of customer records for authorization of the customer;
   receiving an authorization indication from the central terminal.

6. A method according to claim 5 further comprising:
responsive to a positive authorization indication, enabling the fuel dispensing station to dispense fuel.

7. A method of reducing drive-offs at a fuel dispensing station comprising:
receiving a fuel dispensing authorization request, including identifying indicia, from the fuel dispensing station, the identifying indicia being extracted from an identification document of a customer by an identification document reader of the fuel dispensing station;
querying a database of customer records for authorization of the customer;
receiving an indication of customer authorization from the database; and
transmitting the indication to the fuel dispensing station, and wherein the identification document is unusable for payment.

8. The method of claim 7, wherein an off-site terminal includes the database of customer records.

9. The method of claim 7, further comprising transmitting a fuel dispenser enablement signal to the fuel dispensing station to enable a fuel dispenser at the fuel dispensing station, if the indication is positive.

10. The method of claim 7, further comprising storing the identifying indicia at least until the customer completes fuel dispensing, if the indication is positive.

11. The method of claim 10, further comprising releasing the identifying indicia if the customer pays for the dispensed fuel.

12. The method of claim 10, further comprising storing the identifying indicia in the database if the customer does not pay for the dispensed fuel.

13. The method of claim 10, further comprising generating a drive-off ticket that includes the identifying indicia if the customer does not pay for the dispensed fuel.

14. The method of claim 10, further comprising providing the identifying indicia to law enforcement personnel if the customer does not pay for the dispensed fuel.

15. The method of claim 7, further comprising notifying the customer of a reason for refusal of authorization, if the indication is negative.

16. The method of claim 15, further comprising providing the customer information about a past due balance or outstanding warrant, if the indication is negative.

17. A drive-off reducing indicia identifying identification document for use on a fuel dispenser at fuel dispensing stations, wherein the identification document comprises a magnetic strip containing identifying indicia provided by a customer, the magnetic strip being read by an identification document reader and queried against a database containing customer records, wherein said database transmits an indication to the fuel dispensing station enabling the fuel dispenser and allowing the customer to dispense fuel wherein the identification document is unusable for payment.

18. The identification document of claim 17, wherein said identification document is not used for prepayment.

19. The identification document of claim 18, wherein the identification document is one or more members selected from the group consisting of a membership card, a driver's license, a passport, a green card, a state issue identification card, and a federal identification card.

20. The identification document of claim 19, wherein the identification document is selected from the group consisting of a driver's license, a passport, a green card, a state issue identification card, and a federal identification card.

21. A method for remote authorization of fuel dispensing comprising the steps:
receiving a fuel dispensing authorization request, including identifying indicia, from a fuel dispensing station, the identifying indicia being extracted from an identification document of a customer by an identification document reader of the fuel dispensing station, the identification document being unusable for payment;
querying a database of customer records for authorization of the customer;
receiving an indication of customer authorization from the database; and
responsive to a positive indication, enabling the fuel dispensing station to dispense fuel.

22. A method according to claim 21 wherein the steps of receiving a fuel dispensing authorization request, querying a database and receiving an indication are carried out by a central terminal in communication with the fuel dispensing station.

23. A method according to claim 22 wherein the step of enabling the fuel dispenser to dispense fuel is carried out at least in part by the central terminal upon receiving a positive indication.

24. A method according to claim 22 wherein the step of enabling the fuel dispenser to dispense fuel is carried out at least in part by an attendant.

25. A method according to claim 21 wherein the step of enabling the fuel dispenser to dispense fuel comprises:
transmitting the indication to the fuel dispensing station.

26. A system for remote authorization of fuel dispensing comprising:
a database for storing customer records;
a central terminal in selective communication with the database, the central database being configured for receiving customer identification indicia from a fuel dispensing station, querying the database for authorization of the customer, and receiving an indication of customer authorization from the database; and
a fuel dispensing station, comprising
a fuel dispenser,
an identification document reader configured for extracting the identifying indicia from an identification document presented by a customer, the identification document being unusable for payment for fuel dispensed by the fuel dispensing station, and
a processor configured for receiving the identifying indicia from the identification document reader and transmitting a fuel dispenser authorization request including the identifying indicia to the central terminal.

27. A system according to claim 26 wherein the central terminal is further configured to transmit a fuel dispensing enablement signal to the fuel dispensing station in response to receiving a positive indication of customer authorization.

28. A system according to claim 26 wherein the central terminal is further configured to transmit the indication of customer authorization to the fuel dispensing station in response to receiving a positive indication of customer authorization and wherein the processor of the fuel dispensing station is further configured for receiving the indication of customer authorization.

29. A method for remote authorization of fuel dispensing comprising:
receiving a fuel dispensing authorization request, including identifying indicia, from a fuel dispensing station, the identifying indicia being extracted from an identification document of a customer by an identification document reader of the fuel dispensing station;
querying a first database of customer records for authorization of the customer;

receiving an authorization response from the first database, the response including an indication of authorization or indication that the database contains no record for the customer;

responsive to receiving an indication that the first database contains no record for the customer, querying a second database of customer records for authorization of the customer and receiving an indication of authorization of the customer from the second database; and responsive to a positive indication, enabling the fuel dispensing station to dispense fuel.

30. A method for remote authorization of fuel dispensing comprising:

receiving a fuel dispensing authorization request, including indicia extracted from a customer-presented document by a document reader of the fuel dispensing station, the document being unusable for payment;

querying a database of records associated with the indicia;

receiving an indication of authorization from the database; and responsive to a positive indication, enabling the fuel dispensing station to dispense fuel.

31. A method according to claim 30 wherein the document is an identification document and the indicia include identification information.

32. The method of claim 31, wherein the identification document is one or more members selected from the group consisting of a driver's license, a passport, a green card, a state issue identification card, and a federal identification card.

33. A method according to claim 30 wherein the steps of receiving a fuel dispensing authorization request, querying a database and receiving an indication are carried out by a central terminal in communication with the fuel dispensing station.

34. A method according to claim 33 wherein the step of enabling the fuel dispenser to dispense fuel is carried out at least in part by the central terminal upon receiving a positive indication.

35. A method according to claim 34 wherein the step of enabling the fuel dispenser to dispense fuel is carried out at least in part by an attendant.

36. A method according to claim 35 wherein the step of enabling the fuel dispenser to dispense fuel comprises:

transmitting the indication to the fuel dispensing station.

* * * * *